United States Patent [19]
Potemkin

[11] Patent Number: 4,770,075
[45] Date of Patent: Sep. 13, 1988

[54] CUTTING-OFF TOOL

[76] Inventor: Gennady Y. Potemkin, Orekhovy proezd, 19, kv. 19, Moscow, U.S.S.R.

[21] Appl. No.: 932,508
[22] PCT Filed: Mar. 27, 1986
[86] PCT No.: PCT/SU85/00024
§ 371 Date: Oct. 10, 1986
§ 102(e) Date: Oct. 10, 1986
[87] PCT Pub. No.: WO86/05726
PCT Pub. Date: Oct. 9, 1986

[51] Int. Cl.⁴ ............................................. B23B 29/00
[52] U.S. Cl. .................................. 82/36 A; 407/83; 407/89; 407/108; 407/117
[58] Field of Search .................................... 407/81–84, 407/89, 90, 94, 101, 108, 113, 117; 82/36 R, 36 A

[56] References Cited
U.S. PATENT DOCUMENTS 1,042,190 10/1912 Binger ................................... 407/83
1,584,347 5/1926 Armstrong ........................... 407/117
2,335,570 11/1943 Montgomery ...................... 407/117
3,245,288 4/1966 Fried .................................... 407/117

FOREIGN PATENT DOCUMENTS 130715 1/1949 Australia ............................... 407/89
536088 11/1955 Italy ...................................... 407/83
86/05726 10/1986 PCT Int'l Appl. .................. 407/117
717107 10/1954 United Kingdom .................. 407/89
764855 9/1980 U.S.S.R. ............................. 407/117

Primary Examiner—Nicholas P. Godici
Assistant Examiner—Richard K. Seidel
Attorney, Agent, or Firm—Burgess, Ryan & Wayne

[57] ABSTRACT

A cutting-off tool comprises a holder (1) and a disk cutter member (2) with recesses (4) being interconnected by means of the bushings (5) having projections (6) which are received in the respective recesses (4) of the cutting-off tool (2) and wedge-and-screw mechanisms which interact with the cutting-off tool (2). Each bushing (5) has a longitudinal groove (13) leading out on its end face having the projection (6).

2 Claims, 2 Drawing Sheets

CUTTING-OFF TOOL

TECHNICAL FIELD

The present invention relates to metal working and, more particularly, it relates to cutting-off tools.

BACKGROUND ART

There is known in the art a composite cutting-off tool according to U.S.S.R. Inventor's Certificate No. 764,855 issued on Aug. 18, 1977 and published on Sept. 23, 1980. Said prior art tool comprises a holder and a disk cutter member with recesses provided on one of its end faces. The holder and the cutter member are interconnected by means of bushings, each having a projection made on one of its end faces and received in the respective one of the recesses provided on the end face of the cutter member, and wedge-and-screw mechanisms each of which is positioned in the opening of a respective bushing and interacts by the sloping surface of its wedge with the peripheral surface of the cutter member. The prior art tool may only be used to perform operations under conditions of low cutting forces when there occur no considerable bending moments acting upon the cutter member of the tool, in other words, the tool lacks proper rigidity. The low rigidity of the tool is due to the presence of a gap between the holder and bushing after securing the cutter member. The gap is caused by the fact that, in the course of securing the cutter member, the wedge-and-screw mechanism urges the bushing to self-align by turning about its axis.

SUMMARY OF THE INVENTION

The present invention is aimed at solving the problem of developing a cutting-off tool wherein a bushing joining together a cutter member and a holder would be designed such as to provide for a gapless joint and, thereby, increase the rigidity of the tool.

The problem set is solved owing to the fact that in a cutting-off tool comprising a holder and a disk cutter member with recesses provided on one of its end faces, said holder and cutter member being interconnected by means of bushings, each having a projection made on one of its end faces and received in the respective one of the recesses provided on the end face of the cutter member, and of wedge-and-screw mechanisms each of which is positioned in the space of a respective bushing and interacts by the sloping surface of its wedge with the peripheral surface of the cutter member, according to the present invention, each bushing has a longitudinal groove made thereon and leading out to the projection-bearing end face.

The provision of bushings with longitudinal grooves ensures a tight gapless fit of the bushings in the holder holes and, consequently, a higher rigidity of the cutting-off tool.

It is preferred that the outlet of the longitudinal groove be positioned between the bushing projection and axis. With such an arrangement of the groove, the latter divides the bushing into two parts of different rigidity, namely, a more rigid part which serves to support the wedge and a less rigid part which is more pliable and moves in a radial direction to ensure gapless mating of the bushing with the holder. The provision of longitudinal grooves on the bushings adds considerably to the rigidity of the cutting-off tool and, as a result, said tool may be used under conditions of substantial cutting forces and may have a longer working head.

BRIEF DESCRIPTION OF THE DRAWINGS

The present invention will be better understood upon considering the following detailed description of an exemplary embodiment thereof to be taken in conjunction with the accompanying drawings in which.

BEST MODE FOR CARRYING OUT THE INVENTION

The herein disclosed cutting-off tool comprises a holder 1 and a disk cutter member 2, attached to each other.

The cutter member 2 is fitted with four hard-alloy plates 3 and serves the function of the tool working head with effective throat depth R.

Figure 1:
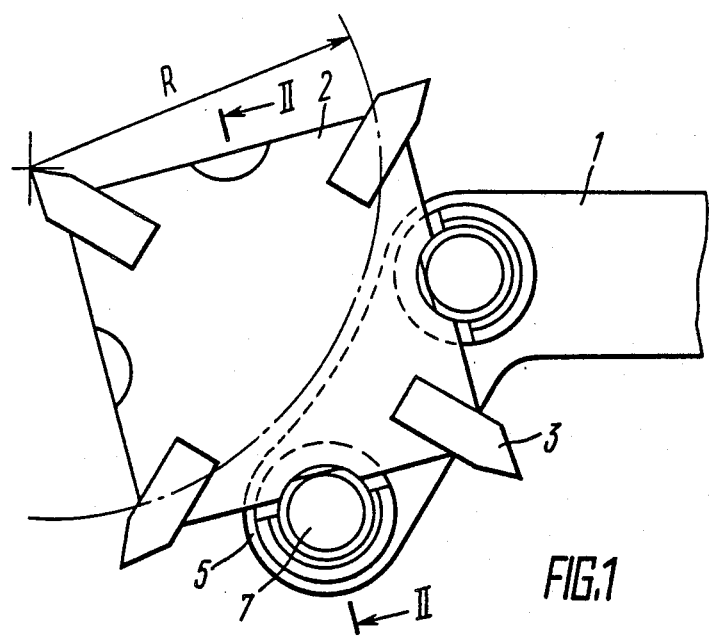
FIG. 1 shows a general (side) view of the cutting-off tool, according to the invention.
Figure 2:
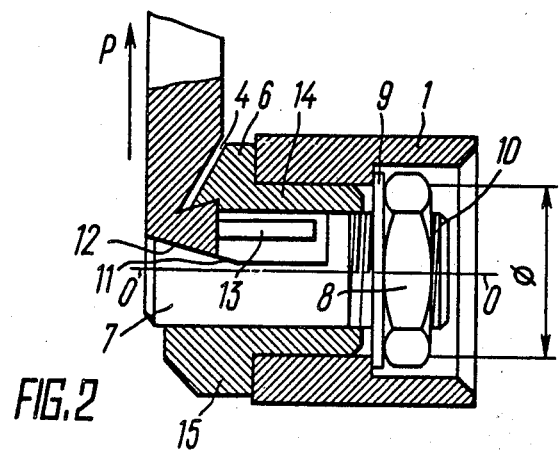
FIG. 2 is a section of one of the bushings taken along the line II—II (scaled up)
Figure 3:
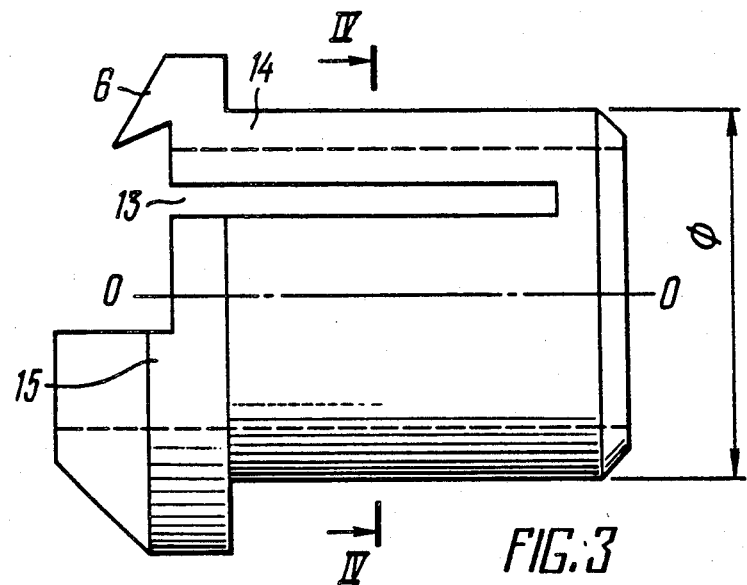
FIG. 3 shows a side elevational view of one of the bushings according to the present invention.
Figure 4:
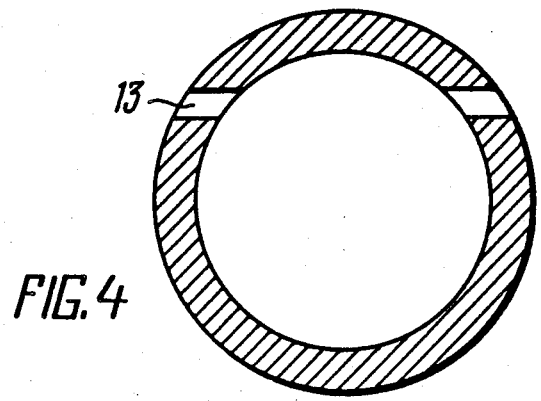
FIG. 4 is a cross-sectional view of the bushing of FIG. 3, taken along line IV—IV thereof.

The cutter member 2 is provided with recesses 4 (FIG. 2) positioned on one of its end faces.

The holder 1 and the cutter member 2 are interconnected by means of bushings 5 and wedge-and-screw mechanisms. The bushings 5 are positioned in holes of the holder 1. In so doing, each bushing 5 is provided with a projection 6 made on its end face and received in the respective one of the recesses 4 on the cutter member 2. Each wedge-and-screw mechanism is disposed in the space of the respective one of the bushings 5 and includes a wedge 7 made fast in the bushing 5 with the aid of a nut 8 and a washer 9 of a screw 10. Each wedge-and-screw mechanism interacts by a sloping surface 11 of its wedge 7 with a peripheral surface 12 of the cutter member 2.

According to the present invention, each bushing 5 has a longitudinal groove 13 made thereon and leading out to the end face of the bushing 5 bearing the projection 6. The outlet of the longitudinal groove 13 is positioned on the bushing 5 between the projection 6 and the bushing axis 0—0 and divides the bushing 5 into two parts of different rigidity, namely, a less rigid part 14 and a more rigid part 15.

The herein disclosed cutting-off tool is prepared for operation in the following manner.

When the cutter member 2 is being secured on the holder 1 of the cutting-off tool by means of the bushings 5 with the longitudinal grooves 13 provided thereon, there first occurs the self-alignment of the bushings 5 to a desired angular position. The presence of a gap between the surface of hole in the holder 1 and the outer surface of every bushing 5 provides for the possibility of self-alignment of the bushings 5. After that, the nut 8 urges the wedge 7 to move along the axis 0—0 in the bushing 5 and to shift, by its sloping surface 11, the cutter member 2 in direction P perpendicular to the axis 0—0. While moving, the cutter member 2 presses by one of the sides of its recess 4 against the projection 6 and shifts the less rigid part 14 of the bushing 5 in the same direction; as a result, the diameter of the bushing 5 increases.

The diameter of the bushing 5 increases within the limits providing for a tight gapless fit of the bushing in the hole of the holder 1, this leading to a higher rigidity of fastening of the cutter member 2.

Upon displacement of the less rigid part 14 of the bushing 5, the other, more rigid part 15 thereof remains in place and serves to support the wedge 7.

The attachment of the disk cutter member 2 to the holder 1 of the tool using attachment fittings of increased rigidity enables one to increase the length of the working head of the tool to a size of about 1.5 times bigger than analogous heads of conventional cutting-off tools. The high rigidity of the cutting-off tool provides for its correspondingly high efficiency in performing appropriate operations, accompanied by a longer service life of the tool thanks to the reduction of the number of accidental breakdowns.

INDUSTRIAL APPLICABILITY

This invention can be used most advantageously in lathes for machining various grooves in parts and for cutting diverse materials.

The invention may also find application in planers for performing analogous operations.

What is claimed is:

1. A cutting-off tool comprising:
   (a) a holder;
   (b) a disk cutter member having a cutter member end face, a peripheral surface and recesses provided on said cutter member end face;
   (c) a plurality of bushings, each bushing received in a respective one of said recesses and having:
      (i) a projection-bearing surface;
      (ii) a projection on said projection-bearing surface;
      (iii) a space therein; and
      (iv) at least one longitudinal groove opening to said projection-bearing surface, said at least one longitudinal groove dividing the bushing into a less rigid portion and a more rigid portion;
   (d) a plurality of wedge-and-screw mechanisms, each positioned in the space of a respective one of said bushings and each having a sloping surface which interacts with the peripheral surface of the cutter member; and
   (e) said holder and cutter member being interconnected by said bushings and said wedge-and-screw mechanisms, wherein said less rigid portion is displaced by said wedge-and-screw mechanisms.

2. A cutting-off tool comprising:
   (a) a holder;
   (b) a disk cutter member having a cutter member end face, a peripheral surface and recesses provided on said cutter member end face;
   (c) a plurality of bushings, each bushing received in a respective one of said recesses and having:
      (i) a projection-bearing surface;
      (ii) a projection on said projection-bearing surface;
      (iii) a central axis;
      (iv) a space therein;
      (v) a bushing end face; and
      (vi) at least one longitudinal groove opening to said projection-bearing surface and having an outlet positioned between the projection and said central axis, said at least one longitudinal groove dividing the bushing into a less rigid portion and a more rigid portion;
   (d) a plurality of wedge-and-screw mechanisms, each positioned in the space of a respective one of said bushings and each having a sloping surface which interacts with the peripheral surface of the cutter member; and
   (e) said holder and cutter member being interconnected by said bushings and said wedge-and-screw mechanisms, wherein said less rigid portion is displaced by said wedge-and-screw mechanisms.

* * * * *